Feb. 24, 1942.  C. M. JOHNSON  2,274,549
TEMPORARY FASTENER
Filed May 22, 1940
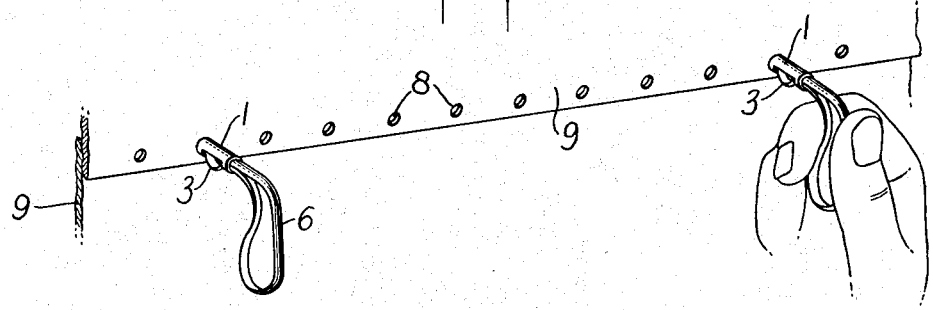
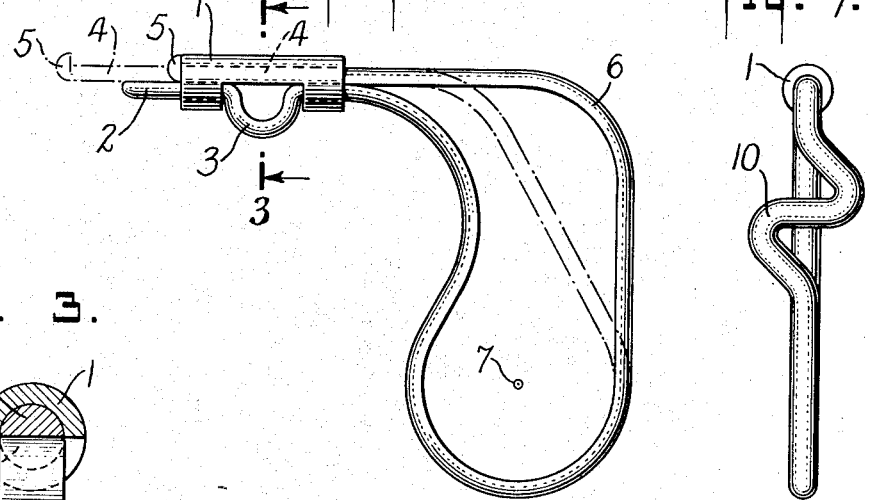
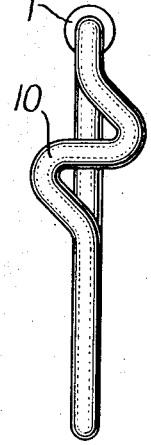
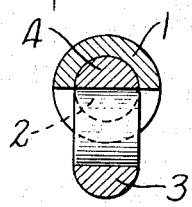
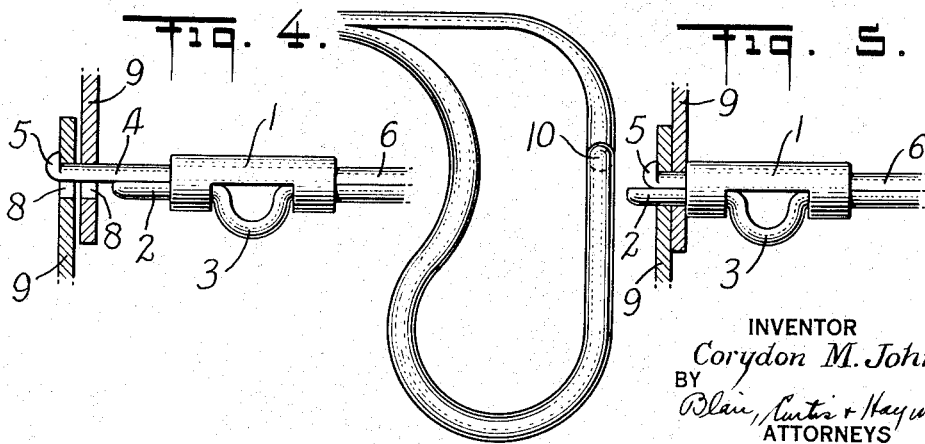
INVENTOR
Corydon M. Johnson
BY
Blair, Curtis + Hayward
ATTORNEYS Patented Feb. 24, 1942

2,274,549

UNITED STATES PATENT OFFICE 2,274,549

TEMPORARY FASTENER

Corydon M. Johnson, Freeport, N. Y.

Application May 22, 1940, Serial No. 336,521

1 Claim. (Cl. 85—5)

This invention relates to a temporary fastener element.

In many industries such as the aeroplane industry it is necessary to secure the overlapping edges of two plates together. This is usually done by preformed rivet receiving apertures adjacent the edges of the plates, registering the apertures of one plate with those of the other, passing rivets through the registered apertures, and upsetting the rivets.

In practice it has been the custom to temporarily fasten the plates together by passing a removable fastening element through certain of the registering apertures in the plates, riveting the plates together by passing the rivets through the remaining registered apertures, then removing the temporary fastening means and riveting through these registered apertures.

The device of the present invention relates to a temporary fastener for securing the plates together during the riveting operation.

In Figure 1 I have conventionally illustrated two overlapping plates with the apertures registered at the left end of the figure, the temporary fastening being disclosed in position and at the right end of the figure the manner in which it is applied or removed being disclosed.

Figure 2 is an enlarged view of the temporary fastener showing in construction lines the relative positions of the parts during the insertion or removal of the fastener through the apertures of the overlapping plates.

Figure 3 is a section on lines 3—3 of Figure 2.

Figure 4 is an enlarged fragmentary view showing the manner in which the fastener is inserted in or removed from the apertures of the overlapping plates.

Figure 5 is a similar view showing the temporary fastener in its locking position.

Figure 6 is a fragmentary view of a modification of the operating handle of the device.

Figure 7 is a similar view taken at right angles to Figure 6 showing the thumb seat.

The device illustrated in the drawing includes two portions, a locking pin portion and an operating handle portion. The pin portion includes a sleeve 1 in which is secured by suitable means a pin section 2 so that there is no relative movement between the sleeve and this pin section 2.

I have illustrated a practical means of assembling these two elements 1 and 2 by bending the pin section 2 at 3 to engage in a recess formed in the sleeve. A relative movable pin section 4 passes through the sleeve 1 and is adapted to slide therethrough and in relation to the pin section 2. On the end of this pin section 4 a hook 5 is formed. The pin sections 1 and 2 continue beyond the end of the sleeve to form a handle 6. This locking pin portion and handle may be formed of a single piece of metal and I have shown it as of half round wire. The handle portion 6 of the device is resilient and is so arranged that it tends to expand on its center of radius 7, thus drawing the hook 5 on the end of the pin section 4 toward the sleeve 1 so that the end of the pin section 2 extends normally beyond the hook 5 as illustrated in Figure 2.

The diameter of the combined pin sections 1 and 2 is less than that of the registering apertures 8 of the plates 9 so that the pin sections may seat within said apertures. However, the distance between the end of the hook 6 and the opposite edge of the pin section 2 is greater than the diameter of these registering apertures so that when the parts are in their locking positions as illustrated in Figure 5 the device will not accidentally be displaceable from its locking position.

Assuming the device to be in the condition shown in Figure 2, and that it is desired to lock two of the plates 9 together by inserting the locking pin through registering openings 8 therein, the handle 6 is compressed against its resiliency. This forces the pin section 4 beyond the end of the pin sections 2 to an extent greater than the combined thicknesses of the plates 9. The diameter of the hook 5 is preferably less than the diameters of the apertures 8 so that the extended pin section 4 may be pushed through the registering apertures 8 while the handle 6 is still compressed. After being put in this position the handle is released and by its resiliency draws the hook 5 and the sleeve 1 relatively toward each other. In so doing it forcibly engages the hook 5 with the remote plate 9 and forces the end of the sleeve 1 tightly against the adjacent plate 9. By the resiliency of the handle these two plates are thus held together against separation. Because of the entry of the pin section 2 into the apertures as shown in Figure 5, the apertures in which the pin is located and the remaining apertures of the plates are held in registration, the latter in readiness for the receipt of rivets.

In Figures 6 and 7 of the drawing I have illustrated a modification of the device in which the handle portion 6 is provided with a thumb seat 10 against which the operator may place his thumb in order to more easily operate the device.

After the rivets have been placed through the registering openings of the plates and have been upset, the temporary locking pins may be removed by a reversal of the action herein described and the rivets inserted through and upset in the thus released apertures.

While I have illustrated and described a particular form of my device, it is to be realized that many changes in the details of construction may be made without departing from the spirit of the invention or exceeding the scope of the claim.

What I claim is:

In a temporary fastener, a single piece of metal formed into pin sections movable longitudinally relative to each other, a resilient handle section tending to move said pin sections relative to each other, a sleeve having a longitudinal opening through which said pin sections pass, one of said pin sections having a hook on the end thereof and adapted to slide in said opening, the other of said pin sections having a kink therein extending through a lateral opening in the sleeve to hold the sleeve section rigidly and immovable on said pin section.

CORYDON M. JOHNSON.